Feb. 15, 1966 R. G. ROCKWELL, JR 3,235,704
APPARATUS FOR JOINING MATERIALS
Filed Jan. 21, 1963 2 Sheets-Sheet 1

INVENTOR.
RALPH G. ROCKWELL JR.

BY *[signature]*

ATTORNEY

Feb. 15, 1966   R. G. ROCKWELL, JR   3,235,704
APPARATUS FOR JOINING MATERIALS
Filed Jan. 21, 1963   2 Sheets-Sheet 2
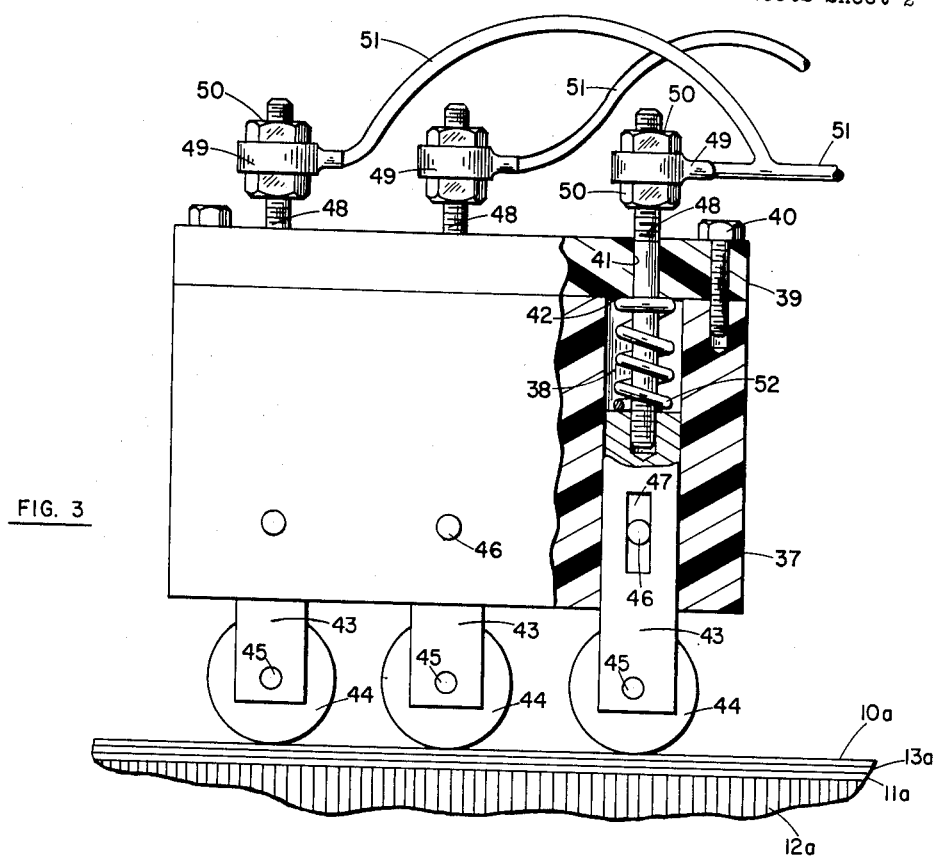
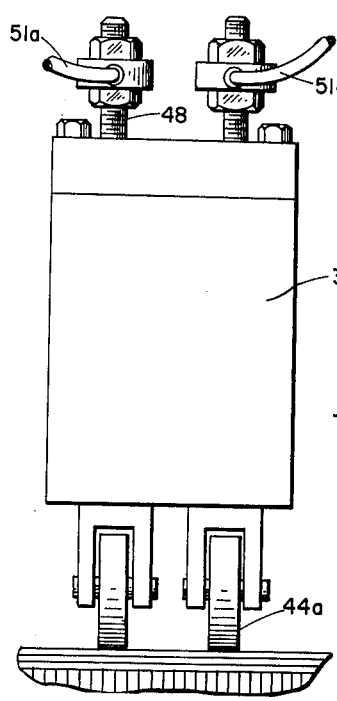
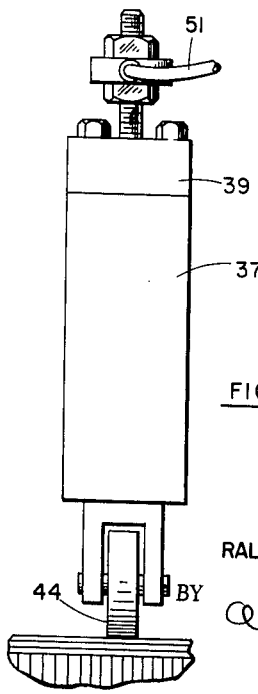
INVENTOR.
RALPH G. ROCKWELL JR.
BY
ATTORNEY

United States Patent Office 3,235,704
Patented Feb. 15, 1966

3,235,704
APPARATUS FOR JOINING MATERIALS
Ralph G. Rockwell, Jr., San Pedro, Calif., assignor to North American Aviation, Inc.
Filed Jan. 21, 1963, Ser. No. 252,992
6 Claims. (Cl. 219—119)

This invention relates to methods and apparatus for bonding material and, more particularly, to methods and apparatus by use of which an electrically conductive sheet can be bonded to a second sheet which is not required to be electrically conductive. The invention is particularly advantageous as applied to the joining of metallic sheets by resistance brazing.

Although resistance brazing has long been used to bond together the surfaces of metallic sheets, known techniques have proved unsatisfactory in many instances. Inadequacies of such techniques are of particular significance where relatively thin sheets must be joined, as in attaching a thin metallic sheet to the facing sheet of the honeycomb core sandwich material now extensively used to impart rigidity to aircraft and missile structures. Methods and apparatus heretofore employed for resistance brazing subject the materials to be joined to relatively high pressure and temperature, either of which can cause irreparable damage to the thin metallic facing sheets of a honeycomb core sandwich material. Furthermore, known resistance brazing techniques are generally accomplished by either attaching clamp-type electrodes to the sheets to be joined, or by pressing electrodes against opposed surfaces of overlapped sheets. When clamp-type electrodes are used, the electric current required to fuse the brazing alloy placed between the sheets cannot be determined with exactness for workpieces of varying sizes, and, in addition, attaching the electrodes to separate workpieces consumes time and entails considerable inconvenience. When opposed electrodes are used, workpieces must be accessible on two sides, a condition that cannot always be met. In both cases, as previously stated, thin workpieces are damaged by the relatively high pressures and temperatures required.

Accordingly, it is an object of this invention to provide improved methods and apparatus which obviate inadequacies of prior techniques for joining sheet material. This object is accomplished by means of unique configurations of a plurality of electrodes which enable electric current to be passed through a relatively small portion of but a single sheet at the point where the sheet is to be joined to a second sheet by means of a resistance brazing operation or other bonding process requiring the application of heat to cause adhesion of a heat-sensitive bonding material to sheets in contact therewith. More specifically, in accordance with one embodiment of the invention the ends of two concentric electrodes are pressed against the electrically conductive outer sheet of a three-layer sandwich comprising two sheets which are to be joined and a layer of heat-sensitive bonding material interposed between them. Upon contact between the electrodes and outer electrically conductive sheet, electric current passes from one electrode into the sheet, flows radially through the sheet, thereby heating it, and then passes out of the sheet into the other electrode. Because of the unique concentric configuration of the electrodes the heating effect of the current flow through the electrically conductive sheet is concentrated in the area immediately underlying the inner electrode, and bonding is accomplished rapidly and with enhanced control of the amount of current required to produce the desired heating of the sandwiched sheets and brazing material. Furthermore, bonding can be effected without excessive pressure and temperature, without the necessity of attaching clamp-type electrodes to the sheets, and without the necessity of access to both sides of the sandwiched sheets.

In accordance with other embodiments of the invention, seam bonding of a three-layer sandwich, comprising two sheets and a layer of bonding material as described above, is accomplished by pressing the outer electrically conductive sheet thereof against electrically conductive pressure wheels which are rotatably mounted on two or more spaced electrodes. As the pressure wheels are moved along the surface of the electrically conductive outer sheet, electric current passes from one or more of the pressure wheels into the sheet, flows through the sheet and heats it, and then passes into one or more different pressure wheels. The unique configurations of these additional embodiments of the invention also provide rapid and concentrated heating of the sandwiched materials immediately under the path of the wheels on the surface of the electrically conductive outer sheet, and the above-described advantages are achieved.

Additional objects of this invention include the joining of an electrically conductive sheet to a second sheet without requiring access to both sides of the sandwiched sheets or subjecting the sheets to excessive temperature and pressure.

It is another object of the invention to provide improved methods and apparatus for resistance brazing by means of which metallic sheets can be joined without subjecting the sheets to excessive temperature and pressure.

It is yet another object of the invention to provide improved methods and apparatus for resistance brazing by means of which a metallic sheet can be joined to a second metallic sheet which is accessible on one side only.

These and other objects and advantages of the invention will be apparent in the light of the following description and drawings in which:

FIG. 3 is a view of a second embodiment of the invention with parts broken away;

FIG. 4 is an end view of the embodiment of the invention shown in FIG. 3; and

FIG. 5 illustrates a third embodiment of the invention.

Throughout the drawings and specification like reference numbers refer to like parts.

Figure 1:
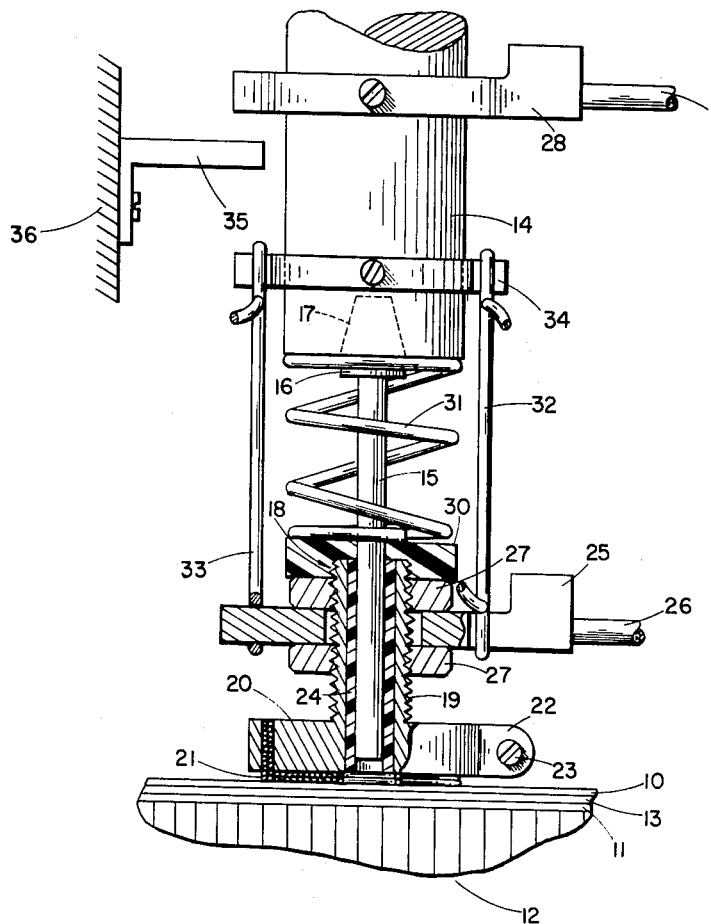
FIG. 1 is a view of one embodiment of the invention with parts broken away.

In FIG. 1 a preferred embodiment of resistance brazing apparatus incorporating principles of this invention is shown in position against the exterior surface of an electrically conductive sheet 10 which is to be bonded to a facing sheet 11 overlying and forming an integral part of a honeycomb core sandwich material generally designated as 12. As an example of the material which may be bonded by means of the invention, both sheets 10 and 11 may consist of PH15–7 Mo stainless steel. The composition of PH15–7 Mo stainless steel is given on page 467 of "Metals Handbook," 8th Edition, published by American Society For Metals, Novelty, Ohio. As will be set out hereinafter in more particular detail, the electrical characteristics of sheet 11 are of little importance since it is only necessary that the outer sheet 10 be capable of conducitng electricity and being heated thereby. A layer of brazing material 13 is sandwiched between sheets 10 and 11 so as to cover all areas where bonding of said sheets is desired. For bonding the PH15–7 Mo stainless steel mentioned above, a silver-lithium brazing alloy may be used. It will be understood that the utility of the invention is not restricted to bonding with brazing material and that it will be equally effective when used with other materials which adhere to surfaces with which they are in contact when subjected to heat and pressure. It will also be evident that only the upper surface of the honeycomb core sandwich material 12 need be exposed in order to make possible the bonding of sheet 10 to facing sheet 11 by use of the pictured embodiment of the invention. As mentioned above, workpieces are often inaccessible on two sides, this condition being particularly common in the fabrication of aircraft and missiles on which honeycomb core sandwich material is used as a surface covering. The invention therefore has particular utility and advantage where this problem of access exists.

An electrode support member 14 is held substantially perpendicular to the surface of sheet 10, this member being part of a support structure (not shown) such as a stationary machine or being formed with a suitable handle providing a portable hand tool. An inner electrode 15 in the form of a cylindrical rod is rigidly mounted in the electrode support member by means of an integrally formed enlargement 16 on said electrode which is fixedly secured in a tapered hole 17 in the electrode support member. The inner electrode is also held substantially perpendicular to the surface of sheet 10. A tubular electrode generally designated at 18 is provided external to and concentric with the inner electrode and has an externally threaded upper portion 19 and an apertured integral lower flange portion 20 to which is attached an electrically conductive mat 21 formed of braided copper wire or other soft, flexible material that readily conducts both heat and electricity. Electrodes 15 and 18 may be formed of any material used in spot welding electrodes.

Figure 2:
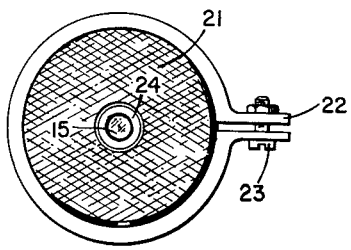
FIG. 2 shows an electrically conductive mat which is attached to one electrode used in the embodiment of the invention shown in FIG. 1.

As shown in FIG. 2, the electrically conductive mat 21 has an annular configuration and includes an aperture that mates with the aperture in electrode 18 so that electrode 15 may pass therethrough to selectively contact sheet 10. The mat is attached in electrically conductive relationship to the flange portion of electrode 18 by means of a ring clamp 22 having a tightening bolt 23. Since the mat is formed of a relatively soft, flexible material, it will conform to any irregularity in the surface of sheet 10 and provide better electrical contact therewith than would be provided by the bare surface of electrode 18. Also since the concentric arrangement of the electrodes provides a large area of contact between the mat and sheet 10, there is lower current density at points radially disposed from electrode 15 than at the area immediately under said electrode. Therefore, the heating which results from current flow through sheet 10 is concentrated under the inner electrode 15, and brazing alloy 13 is quickly heated by thermal conduction in the vicinity of this electrode to the temperature at which it bonds to sheets 10 and 11. Furthermore, the concentric arrangement of the electrodes eliminates the inconvenience and uncertainty associated with conventional resistance brazing techniques in which the length of the current path through the materials which are to be bonded varies. Consequently, when conventional brazing techniques are used, the current necessarily must be adjusted if, in case clamp-type electrodes are used, the clamps are inadvertently or by necessity positioned on the workpieces at variable distances from each other, or if, in case opposed electrodes are used, the sandwiched sheets have variable thicknesses and the length of the current path through said sheets is consequently changed. In contrast to this situation, when the above described concentric arrangement of electrodes is used the path of current between the electrodes remains a fixed distance, resistance of the sheet in contact with the electrodes is essentially constant, and the current required for heating is thus the same irrespective of the size of the sheets to be bonded.

Again in reference to FIG. 1, a tubular insulator 24, formed of a dielectric material and having an inside diameter only slightly larger than the diameter of electrode 15, is immovably fixed to the inner wall of electrode 18 by means of cement or a forced fit. This insulator serves as a guide for electrode 15 and prevents electric shorting between it and electrode 18. An electric connector 25, apertured to receive the upper portion of electrode 18 upon which it is mounted, is connected by means of an electric cable 26 to one terminal of an electric power supply (not shown). The electric connector 25 is locked in position on electrode 18 by means of two electrically conductive lock nuts 27 that are threadedly engaged with the upper portion of said electrode. These lock nuts also provide a path for current flow between said electrode and said electrical connector. A second electrical connector 28 is fixed on the electrode support member 14 and connected to a second terminal of the electric power supply by means of an electric cable 29. Electrode 15 is thus electrically connected to one terminal of the power supply and electrode 18 to the other.

The upper portion of electrode 18 is threadedly connected to an electrically non-conductive insulation cap 30, and a spring 31 is interposed between the end of the electrode support member and said insulation cap. The insulation cap prevents electric shorting between the electrode support member and electrode 18 through the spring. As will be described in greater detail below, the spring provides a means for limiting the pressure that the electrically conductive mat exerts on the surface of sheet 10 when the electrode support member is moved downwardly to bring electrode 15 into contact with said sheet. Suspension means 32 and 33 are attached to the terminal connector 25 and to a yoke 34 that is fixed on the electrode support member, these suspension means holding the assembly together against the force exerted by the spring when this embodiment of the invention is not pressed against a surface.

It will be readily seen that the end of electrode 15 can be brought into contact with sheet 10 by applying force downwardly on the electrode support member, thereby compressing the spring and moving electrode 15 downwardly through insulator 24. When electrode 15 contacts sheet 10 the pressure then exerted by the mat 21 on said sheet will depend upon the compression strength of the spring. The arrangement of this embodiment of the invention thus provides a means of limiting the amount of pressure exerted by the mat on sheet 10 through selection of the spring used. Of course, continued application of force on the electrode support member after electrode 15 contacts sheet 10 will increase the pressure exerted by electrode 15 on sheet 10. However, if the electrode support member is part of a stationary machine an adjustable stop 35 mounted on a support 36 may be positioned to contact the electrical connector 28 and prevent further downward movement of the electrode support member after electrode 15 contacts sheet 10. If the electrode support member is part of the handle of a portable hand tool, a dial-type pressure gage (not shown) may be incorporated in the handle to enable an operator to determine when he has applied force on the handle which has been predetermined as sufficient to bring electrode 15 into contact with sheet 10 and which is not to be exceeded.

As previously stated, when electrode 15 is pressed into contact with sheet 10 current passes through electrode 15, sheet 10, mat 21 and electrode 18. This flow of current rapidly heats the portion of sheet 10 underlying electrode 15, and brazing material 13 is also heated by thermal conduction to the temperature at which it becomes bonded to both sheet 10 and facing sheet 11 of the honeycomb core sandwich material. While the utility of the invention is here illustrated in connection with a brazing operation, it is equally useful in other bonding operations in which heat can be employed to bring about adherence of a bonding material to sheets juxtaposed thereto. For example, certain plastics and thermo-setting cements may be substituted for brazing material 13. Although the mode of operation of the invention necessarily requires that the sheet in contact with electrode 15 and the mat 21 be an electrically conductive material, the lower sheet is heated by thermal conduction only and may be either electrically conductive or non-conductive. Thus the lower sheet may be a plastic, a fiber-glass sheet, or any other material to which the bonding material will adhere when placed thereon and subjected to heat and pressure.

FIG. 3 shows another embodiment of the invention by use of which sheets may be bonded together along a seam rather than at spots only. This embodiment is shown in position against an electrically conductive outer sheet 10a which is to be bonded to a second sheet 11a by means of a bonding material 13a. Extending transversely through an electrode support member 37 are three parallel holes 38. A cap member 39 is attached to the electrode support member by means of bolts 40. Three holes generally designated at 41 extend transversely through the cap member in axial alignment with the holes in the electrode support member, the diameter of these holes being smaller than that of the holes in the electrode support member so that the lower surface of the cap member forms a lip 42 projecting inwardly from the upper edge of each of the holes in the electrode support member. Both the electrode support member and the cap member are formed of a dielectric material. Three electrodes 43 in the form of cylindrical rods and made of an electrically conductive material, are slidably mounted in the holes in the electrode support member, the ends of these electrodes extending substantially beyond the lower surface of said member. Electrically conductive pressure wheels 44 are rotatably mounted on the lower ends of the electrodes by means of pins 45, which are also formed of an electrically conductive material to permit flow of current between the wheels and electrodes. A pin 46 passes through a slot 47 cut through each electrode at a right angle to its axis and intermediate thereof. These pins are fixedly secured in the electrode support member and serve to limit longitudinal motion and to prevent rotational movement of the electrodes and their pressure wheels. An electrically conductive rod 48, threaded on each end, is connected to the upper end of each electrode and passes through the axially aligned hole in the cap member, extending substantially beyond said member. Electric connectors 49 are secured to the ends of the rods by means of lock nuts 50 and connected to the terminals of a power supply (not shown) by means of cables 51, the cables from the outside electrodes being connected to one terminal of the power supply and the cable from the inside electrode being connected to the other. A spring 52 is positioned around each rod in the upper portion of each hole in the electrode support member, the spring being compressed between the lip 42 and the electrode so as to resiliently bias the electrode downwardly to a limiting position defined by abutment of the lock nut 50 against the upper surafce of the cap member. FIG. 4 is an end view of this embodiment of the invention illustrating the linear arrangement of the electrodes.

The embodiment of the invention described above and illustrated in FIGS. 3 and 4 can be used to form a seam bond between two sheets sandwiched over a bonding material, the requirements for the materials being the same as those presented above in the discussion of the first embodiment, namely, the sheet that contacts the apparatus must be electrically conductive and the bonding material must adhere to the sheets when subjected to heat and pressure. It is, of course, only necessary to sandwich the bonding material under the area where a seam bond is to be formed between the two sheets. In a manner of operation analogous to that for the embodiment of the invention which utilizes concentric electrodes, when the pressure wheels 44 are brought into contact with the electrically conductive sheet, current flows between the wheels through said sheet, thereby heating the sheet and also heating, by thermal conduction, the bonding material and causing it to adhere to both sheets with which it is in contact. Since the two outer electrodes are connected to one terminal of the power supply and the central electrode to the other, current density at the point of contact between the central pressure wheel is twice that at either of the outer wheels. Heating of the electrically conductive sheet is consequently greater in the vicinity of the center wheel than it is at the outer wheels, and bonding occurs at this point rather than at the outer wheels. Formation of a seam is accomplished by moving the wheels over the area to be bonded, thereby heating sheet 10a along the path of the wheels. Mounting electrically conductive pressure wheels on the ends of the electrodes not only facilitates this movement but also serves to reduce the area when current enters the electrically conductive sheet, thereby increasing current density and concentrating the heating caused by the current.

A third embodiment of the invention, shown in end view in FIG. 5 is analogous to that shown in FIGS. 3 and 4. Only two electrodes are employed, each mounted as described in connection with FIG. 3, and the electrodes are positioned in an electrode support member 37a so that pressure wheels 44a have a common axis of rotation. This configuration of the electrodes enables parallel seams to be formed in one pass of the pressure wheels over sandwiched sheets and bonding material. Current density at the point of contact between each pressure wheel 44a and the outer electrically conductive sheet will be the same, and therefore heating of said sheet will be the same under each pressure wheel. Furthermore, since current density at the point of contact of the pressure wheels is higher than it is at intermediate points in the sheet, heating will be concentrated under the pressure wheels and seams will be formed along the parallel paths of said pressure wheels on said sheet.

If either of the electrode support members 37 or 37a illustrated in FIGS. 3 and 5 is part of a stationary machine (not shown), the support member may be positioned at a fixed distance above the work table of the machine so that the pressure wheels 44 or 44a will, under the forces exerted by springs 52, press against the sandwiched sheets passed between said pressure wheels and work table. Through selection of springs of suitable strength, the pressure of the wheels on the sheets may be kept below that which would cause damage to said sheets. As in the case of the embodiment of the invention shown in FIG. 1, if either of the electrode support members 37 or 37a is part of the handle of a portable tool (not shown), a dial-type pressure gage (not shown) may be incorporated in the handle to enable an operator to determine when he has applied force on the handle which has been predetermined as adequate to provide good electrical contact between the pressure wheels and the outer sheet yet which is not so high that the sandwiched sheets will be damaged.

Each of the three embodiments of the invention described above has been used in bonding metal sheet as thin as 0.020 inch to a honeycomb core sandwich material having facing sheets 0.020 inch thick, in a brazing operation in which a sheet of brazing alloy 0.0015 inch thick, such as a silver-lithium alloy, was sandwiched between the sheets. Because of the unique configurations of the three described embodiments of the invention, the path of currrent flow through the outer sheet in contact with the electrodes or wheels is a fixed distance and heating of the sandwiched sheets and brazing material can be more closely controlled than in the case of known methods of resistance brazing. Furthermore, bonding of very thin sheets can be accomplished without excessive electrode pressure that damages such sheets.

In the above-mentioned use of the invention in brazing thin metal sheet to the facing sheet of a honeycomb core sandwich material, the temperature of the sheet in contact with the electrodes or pressure wheels did not exceed 1800° F. While a pressure of 50 pounds per square inch was sufficiently low to avoid damage to the thin sheets brazed together in these brazing operations, lower pressure may be used, the only requirement for pressure being that it must be sufficiently high to effect adherence between the particular bonding material and sheets bonded therewith and to establish adequate electrical contact between the electrodes or pressure wheels and the outer electrically conductive sheet.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. Apparatus for joining an electrically conductive sheet to a second sheet comprising:
   an electrode support member,
   a first rod-like electrode fixedly-mounted in the electrode support member,
   said first electrode having a substantially constant diameter and having a flat working surface at the end thereof,
   a second electrode of tubular configuration in concentric relationship with, and spaced from, the first electrode, the second electrode having an enlarged annular circular flange portion at the end thereof that is remotely situated from the electrode support member, a flat electrically conductive mat of annular configuration in mating contact with the lower surface of the flange portion of the second electrode, and means for connecting an electric current source to the first and second electrodes, and
   means for causing said flat working surface of said first electrode and said flat annular mat to be coplanar at the surface of said electrically conductive sheet.

2. Apparatus as claimed in claim 1 including means for mounting said second electrode for motion axially of said first electrode in response to axial motion of said first electrode, and means cooperatively associated with movement of said first electrode for resiliently biasing said axial motion of said second electrode.

3. Apparatus for joining an electrically conductive sheet to a second sheet comprising:
   an electrode support member,
   a first electrode of cylindrical configuration fixedly secured at one end thereof to said electrode support member,
   a second electrode of tubular configuration in concentric relationship with said first electrode, said second electrode having an externally threaded connecting portion and an operating flange portion of increased diameter,
   an electrically conductive mat of annular configuration secured against a surface of said flange portion of said second electrode remote from said connecting portion, said mat being formed of a reticulated, soft, flexible material and having an aperture substantially aligned with the second electrode and its apertured flange portion,
   a dielectric tubular sleeve fixedly secured to and within said tubular second electrode, the end of said first electrode that is remote from the support member being positioned within said sleeve and axially movable therein to a position substantially in transverse alignment with said mat,
   an apertured insulation cap formed of a dielectric material threaded on the upper end of said second electrode, said insulation cap being annular in configuration and having its aperture substantially aligned with said insulation sleeve,
   a spring circumscribing the first electrode and interposed between said insulation cap and said electrode support member to resiliently bias said second electrode axially of said first electrode,
   means for limiting the movement of said second electrode away from said electrode support member under the force exerted by said spring,
   and means for supplying electric current to said first and second electrodes.

4. Apparatus for joining an electrically conductive sheet to a second sheet comprising:
   an electrode support member,
   a first electrode of cylindrical configuration fixedly secured at one end thereof to said electrode support member,
   a second electrode of tubular configuration in concentric relationship with said first electrode, said second electrode having an operating flange portion of increased diameter,
   an electrically conductive mat of annular configuration secured against the exterior surface of said flange portion of said second electrode, said mat being formed of a reticulated, soft, flexible material and having an aperture substantially aligned with the second electrode and its apertured flange portion,
   a dielectric tubular sleeve fixedly secured to and within said tubular second electrode, the end of said first electrode that is remote from the support member being positioned within said sleeve and axially movable therein to a position substantially in transverse alignment with said mat,
   spring means, circumscribing the first electrode and abutting a portion of said electrode support member, for resiliently biasing said second electrode axially of said first electrode,
   means for limiting the movement of said second electrode away from said electrode support member under the force exerted by said spring, and
   means for supplying electric current to said first and second electrodes.

5. Apparatus for joining an electrically conductive sheet to a second sheet comprising:
   an electrode support member,
   a first electrode of cylindrical configuration fixedly secured at one end thereof to said electrode support member,
   a second electrode of tubular configuration in concentric relationship with said first electrode, said second electrode having an externally threaded connecting portion and an operating flange portion of increased diameter,
   an electrically conductive mat of annular configuration secured against a surface of said flange portion of said second electrode remote from said connecting portion, said mat being formed of a reticulated, soft, flexible material and having an aperture substantially aligned with the second electrode and its apertured flange portion,
   a dielectric tubular sleeve fixedly secured to and within said tubular second electrode, the end of said first electrode that is remote from the support member being positioned within said sleeve and axially movable therein to a position substantially in transverse alignment with said mat,
   an apertured insulation cap formed of a dielectric material threaded on the upper end of said second electrode, said insulation cap being annular in configuration and having its aperture substantially aligned with said insulation sleeve, and
   means for supplying electric current to said first and second electrodes.

6. Apparatus for brazing an electrically conductive sheet to a second sheet comprising:
   an electrode support member,
   a first electrode of cylindrical configuration fixedly secured at one end thereof to said electrode support member,
   a second electrode of tubular configuration in concentric relationship with said first electrode, said second electrode having an externally threaded connecting portion and an operating flange portion of increased diameter,
   an electrically conductive mat of annular configuration secured against a surface of said flange portion of said second electrode remote from said connecting portion, said mat being formed of a reticulated, soft, flexible material and having an aperture substantially aligned with the second electrode and its apertured flange portion, an apertured insulation cap formed of a dielectric material threaded on the upper end of said second electrode, said insulation cap being annular in configuration and having its aperture substantially aligned with said insulation sleeve, a spring circumscribing the first electrode and interposed between said insulation cap and said electrode support member to resiliently bias said second electrode axially of said first electrode, means for limiting the movement of said second electrode away from said electrode support member under the force exerted by said spring, and means for supplying electric current to said first and second electrodes—whereby the flow of said electric current produces heat for effectuating the brazing process.

References Cited by the Examiner
UNITED STATES PATENTS

| | | | |
|---|---|---|---|
| 1,189,582 | 7/1916 | Kicklighter | 219—117 |
| 1,303,007 | 5/1919 | Alzmann | 219—85 |
| 1,995,494 | 3/1935 | Bardet et al. | 219—85 |
| 2,141,932 | 12/1938 | Payne | 219—117 |
| 2,467,636 | 4/1949 | Stoudt et al. | 219—119 |
| 2,730,600 | 1/1956 | Fisher et al. | 219—84 |
| 2,918,564 | 12/1959 | Russell | 219—84 |
| 3,036,198 | 5/1962 | Grimland et al. | 219—78 |

RICHARD M. WOOD, *Primary Examiner.*

ANTHONY BARTIS, *Examiner.*